(12) United States Patent
Robinson

(10) Patent No.: US 10,341,398 B2
(45) Date of Patent: *Jul. 2, 2019

(54) APPLICATION PROGRAM AND RELATED TECHNIQUES FOR ORGANIZING A MEETING BETWEEN PEOPLE

(71) Applicant: David R. Robinson, Hanover, MA (US)

(72) Inventor: David R. Robinson, Hanover, MA (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/175,681

(22) Filed: Jun. 7, 2016

(65) Prior Publication Data

US 2016/0285930 A1 Sep. 29, 2016

Related U.S. Application Data

(63) Continuation of application No. 13/958,016, filed on Aug. 2, 2013, now Pat. No. 9,392,038.

(60) Provisional application No. 61/682,907, filed on Aug. 14, 2012.

(51) Int. Cl.
| | | |
|---|---|---|
| *H04L 12/18* | (2006.01) | |
| *H04L 29/06* | (2006.01) | |
| *G06Q 10/10* | (2012.01) | |
| *H04W 4/021* | (2018.01) | |
| *G06F 3/0481* | (2013.01) | |
| *G06F 3/0484* | (2013.01) | |
| *H04W 4/21* | (2018.01) | |

(52) U.S. Cl.
CPC ........ *H04L 65/403* (2013.01); *G06F 3/04817* (2013.01); *G06F 3/04842* (2013.01); *G06Q 10/109* (2013.01); *G06Q 10/1095* (2013.01); *H04L 12/1818* (2013.01); *H04W 4/021* (2013.01); *H04W 4/21* (2018.02)

(58) Field of Classification Search
CPC combination set(s) only.
See application file for complete search history.

(56) References Cited

U.S. PATENT DOCUMENTS

| | | | |
|---|---|---|---|
| 7,330,112 B1 | 2/2008 | Emigh et al. | |
| 7,831,917 B1 * | 11/2010 | Karam | G06Q 10/10 701/408 |
| 8,355,862 B2 * | 1/2013 | Matas | G01C 21/3614 345/441 |
| 8,370,062 B1 * | 2/2013 | Starenky | H04W 4/025 701/467 |
| 2008/0306826 A1 | 12/2008 | Kramer et al. | |
| 2009/0036148 A1 | 2/2009 | Yach | |
| 2009/0063206 A1 | 3/2009 | Payne et al. | |

(Continued)

OTHER PUBLICATIONS

Apple; ITunes Preview: Find My Friends; inet: https://itunes.apple.com/us/app/find-my-friends/id466122094?mt=8&ls=1; printed Jun. 7, 2016; 4 pages.

(Continued)

*Primary Examiner* — Hien L Duong
(74) *Attorney, Agent, or Firm* — Daly, Crowley, Mofford & Durkee, LLP

(57) ABSTRACT

A computer-implemented application program comprises various graphic user interfaces to facilitate the formation of a physical meeting between people. A computer-readable storage medium comprises instructions to implement the computer-implemented application program.

18 Claims, 15 Drawing Sheets

(56) References Cited

U.S. PATENT DOCUMENTS

| | | |
|---|---|---|
| 2009/0254840 A1 | 10/2009 | Churchill et al. |
| 2009/0281843 A1 | 11/2009 | Coffman et al. |
| 2009/0292782 A1 | 11/2009 | Kim et al. |
| 2010/0081457 A1 | 4/2010 | Jerome et al. |
| 2010/0211425 A1 | 8/2010 | Govindarajan |
| 2011/0106896 A1 | 5/2011 | Baransky et al. |
| 2011/0113148 A1 | 5/2011 | Salmela et al. |
| 2011/0130958 A1 | 6/2011 | Stahl et al. |
| 2011/0148576 A1 | 6/2011 | Gupta |
| 2011/0289433 A1 | 11/2011 | Whalin et al. |
| 2012/0030194 A1 | 2/2012 | Jain |
| 2012/0136689 A1 | 5/2012 | Ickman et al. |
| 2012/0165035 A1 | 6/2012 | Chen et al. |
| 2012/0253935 A1 | 10/2012 | Blom |
| 2012/0271883 A1* | 10/2012 | Montoya ............... H04W 4/023 709/204 |
| 2012/0311462 A1 | 12/2012 | Devecka |
| 2013/0015954 A1 | 1/2013 | Thorne et al. |
| 2013/0035856 A1 | 2/2013 | Connors |
| 2013/0096813 A1 | 4/2013 | Geffner et al. |
| 2013/0143587 A1 | 6/2013 | Williams et al. |
| 2014/0032377 A1* | 1/2014 | Oxenham .......... G06Q 30/0601 705/27.2 |
| 2014/0053083 A1 | 2/2014 | Robinson |
| 2015/0005010 A1 | 1/2015 | Zhang et al. |
| 2015/0193819 A1* | 7/2015 | Chang ................ G06Q 30/0252 705/7.19 |

OTHER PUBLICATIONS

Google.com; "friendizer;" inet: https://play.google.com/store/apps/details?id=com.teamagly.friendizer&feature=also_installed#?t=W251bGwsMSwxLDEwNCwiY29LnRIYW1hZ2x5LmZyaWVuZGl6ZXliXQ; printed Aug. 7, 2013; 2 pages.

"Magnet: Connecting Friends Offline"; inet: http://joinmagnet.com/; printed Aug. 18, 2013; 3 pages.

Meol Mobile; "GiddyUp Get Inviting;" inet: http://www.medlmobile.com/apps/iphone/giddyup-get-inviting; printed Aug. 7, 2013; 3 pages.

Sonar Media, Inc.; "Sonar: Friends Nearby;" inet: https://play.google.com/store/apps/details?id=me.sonar.android&hl=en; printed Aug. 7, 2013; 2 pages.

Techcrunch.com; Find Friends Nearby: Facebook's New Mobile Feature for Finding People Around You [Updated]; inet: http://techcrunch.com/2012/06/24/friendshake-facebooks-new-mobile-feature-for-finding-people-nearby-and-a-highlight-killer/; printed Aug. 7, 2013; 3 pages.

U.S. Appl. No. 13/958,016; 252 pages.

* cited by examiner

APPLICATION PROGRAM AND RELATED TECHNIQUES FOR ORGANIZING A MEETING BETWEEN PEOPLE

CROSS REFERENCE TO RELATED APPLICATIONS

This application is a Continuation Application of and claims the benefit of U.S. patent application Ser. No. 13/958,016 filed Aug. 2, 2013, which claims the benefit under 35 U.S.C. § 119(e) of U.S. Provisional Application No. 61/682,907 filed Aug. 14, 2012, which applications are incorporated herein by reference in their entirety.

STATEMENT REGARDING FEDERALLY SPONSORED RESEARCH

Not Applicable.

FIELD OF THE INVENTION

This invention relates generally to computer application programs and, more particularly, to a computer application program with which a user can organize a physical meeting between people.

BACKGROUND OF THE INVENTION

A wide variety of application programs are known that can operate on various types of computing platforms. For example, the application programs can operate on computing platforms that can include, but are not limited to, mainframe computers, desktop computers, laptop computers, tablet computers, and smart cellular telephones.

With some application programs, the user can arrange certain aspects of a meeting between people. For example, with Microsoft® Outlook®, a user can specify a date and a time of a meeting and broadcast the specified date and time to one or more other users of the same application program. User can also broadcast other information in text form, for example, a location of the meeting.

Application programs, such as Microsoft® Outlook®, do not allow communication of some important aspects of a physical meeting between people, for example, a map display of where the meeting is to take place.

It would therefore be desirable to provide a computer application program that can communicate other important aspects of a meeting between people.

SUMMARY OF THE INVENTION

The present invention provides a computer application program that can communicate various important aspects of a meeting between people.

In accordance with one aspect of the present invention, a computer-implemented method of generating a meeting among people includes selecting, with a graphical user interface, a venue; displaying a map in accordance with the venue on a computer display; selecting, with a graphical user interface, a location of the meeting; generating an icon on the map at the location; selecting, with a graphical user interface, a time of the meeting; selecting, with a graphical user interface, one or more people to attend the meeting; associating, with a processor, the selected time and the selected one or more people with the icon on the map; and communicating information identifying the map, the selected time, the selected location of the meeting, and the selected one or more people.

In some embodiments of the computer-implemented method, the computer implemented method includes one or more of the following aspect.

In some embodiments of the computer-implemented method, the venue comprises a city.

In some embodiments of the computer-implemented method, the venue comprises an organized event.

In some embodiments of the computer-implemented method, the computer display is upon a communication device.

In some embodiments of the computer-implemented method, the communication device comprises a smart cellular telephone.

In some embodiments of the computer-implemented method, the selecting the one or more people comprises: storing identifying information of the one or more people as a stored group of information; and assigning an identifying name to the stored group of information.

In some embodiments, the computer-implemented method further comprises: comparing a real time with the selected time of the meeting; identifying, with a satellite location system, a geographic location of at least one of the one or more people if the real time is within a real time threshold of the selected time of the meeting; and viewing on a computer screen, the map, the icon, and a location icon representative of the geographic location.

In some embodiments of the computer-implemented method, the computer display is upon a communication device.

In some embodiments of the computer-implemented method, the communication device comprises a smart cellular telephone.

In some embodiments, the computer-implemented method further comprises: enlisting a member organization; comparing a location of the member organization with the location of the meeting; and displaying a member icon representative of the member organization on the map at a position representative of the location of the member organization if the location of the member organization is within a threshold distance of the location of the meeting.

In some embodiments of the computer-implemented method, the computer display is upon a communication device.

In some embodiments of the computer-implemented method, the communication device comprises a smart cellular telephone.

In some embodiments of the computer-implemented method, the member organization comprises a concession associated with the venue.

In some embodiments of the computer-implemented method, the member organization comprises a restaurant.

In some embodiments of the computer-implemented method, the member organization comprises a bar.

In some embodiments, the computer-implemented method further comprises: selecting, with a graphical user interface, the member organization; and displaying data on the map in accordance with the selecting the member organization, the data describing a feature of the member organization.

In another aspect of the present invention, a computer-readable storage medium having computer-readable code stored thereon, comprises instructions for: selecting, with a graphical user interface, a venue; displaying a map in accordance with the venue on a computer display; selecting, with a graphical user interface, a location of the meeting; generating an icon on the map at the location; selecting, with a graphical user interface, a time of the meeting; selecting, with a graphical user interface, one or more people to attend the meeting; associating, with a processor, the selected time and the selected one or more people with the icon on the map; and communicating information identifying the map, the selected time, the selected location of the meeting, and the selected one or more people.

In some embodiments of the computer-readable storage medium, the computer-readable storage medium includes one or more of the following aspects.

In some embodiments of the computer-readable storage medium, the venue comprises a city.

In some embodiments of the computer-readable storage medium, the venue comprises an organized event.

In some embodiments of the computer-readable storage medium, the computer display is upon a communication device.

In some embodiments of the computer-readable storage medium, the communication device comprises a smart cellular telephone.

In some embodiments of the computer-readable storage medium, the selecting the one or more people comprises: storing identifying information of the one or more people as a stored group of information; and assigning an identifying name to the stored group of information.

In some embodiments, the computer-readable storage medium further comprises instructions for: comparing a real time with the selected time of the meeting; identifying, with a satellite location system, a geographic location of at least one of the one or more people if the real time is within a real time threshold of the selected time of the meeting; and viewing on a computer screen, the map, the icon, and a location icon representative of the geographic location.

In some embodiments of the computer-readable storage medium, the computer display is upon a communication device.

In some embodiments of the computer-readable storage medium, the communication device comprises a smart cellular telephone.

In some embodiments, the computer-readable storage medium further comprises instructions for: enlisting a member organization; comparing a location of the member organization with the location of the meeting; and displaying a member icon representative of the member organization on the map at a position representative of the location of the member organization if the location of the member organization is within a threshold distance of the location of the meeting.

In some embodiments of the computer-readable storage medium, the computer display is upon a communication device.

In some embodiments of the computer-readable storage medium, the communication device comprises a smart cellular telephone.

In some embodiments of the computer-readable storage medium, the member organization comprises a concession associated with the venue.

In some embodiments of the computer-readable storage medium, the member organization comprises a restaurant.

In some embodiments of the computer-readable storage medium, the member organization comprises a bar.

In some embodiments, the computer-readable storage medium further comprises instructions for: selecting, with a graphical user interface, the member organization; and displaying data on the map in accordance with the selecting the member organization, the data describing a feature of the member organization.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
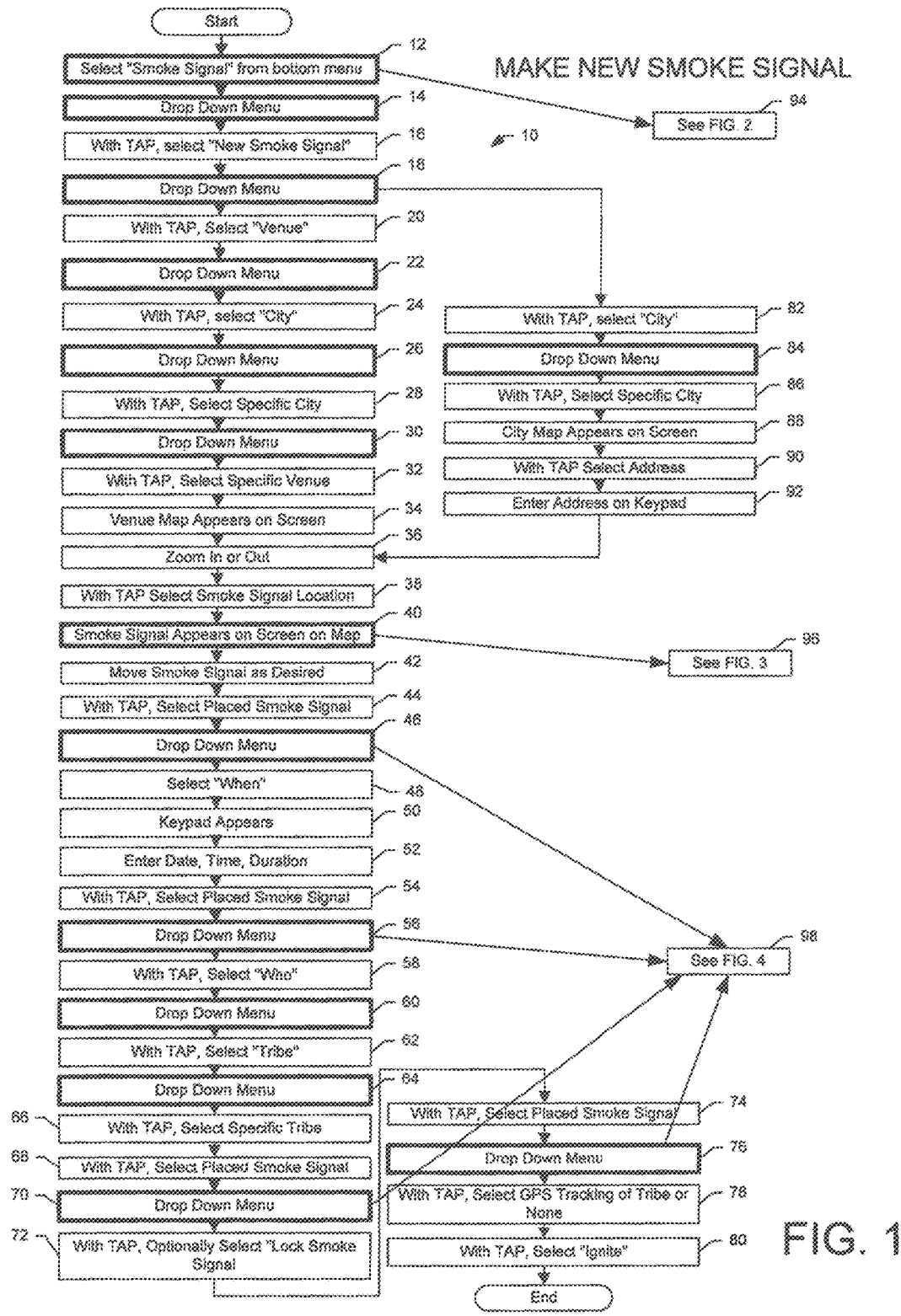
FIG. 1 is a flow chart showing a method of creating a so-called "smoke signal"

Before describing the present invention, some introductory concepts and terminology are explained. As used herein, the term "smoke signal" is used to describe an icon upon a computer display used to represent a physical meeting between people and a physical location of the meeting. The term "smoke signal" is used herein interchangeably with the concept of a physical meeting between people.

As used herein, the term "tribe" is used to describe a specified group of people that can take part in the meeting represented by the smoke signal. A tribe is information stored in a computer-readable storage medium that identifies a group of people and is associated with a tribe name.

As used herein, the term "computing device" or simply "computer" is used to describe any computer platform now known or later developed. A computer platform can include, but is not limited to, a mainframe computer, a desktop computer, a laptop computer, a tablet computer, and a smart cellular telephone.

As used herein, the term "computer display," or simply "display," is used to describe any form of computer platform display now known or later developed associated with any type of computing device. Computer platform displays can include, but are not limited to, liquid crystal displays (LCD) and cathode ray tube (CRT) displays.

While examples are given below that describe certain function and that show certain displays associated with a smart cellular telephone, it should be understood that the techniques described herein relate to any type of computing device and to any type of display.

While examples are shown below that show some selectable options presented on a computer display in horizontal arrangements and other selectable options presented on a computer display as vertically disposed drop down menus, it will be understood that any of the selectable options can be presented in either form, or also in a form that is neither vertical or horizontal, for example, circular. Furthermore, menu options can be presented as speech prompts by the application program and/or can be selected by way of speech selections by the user.

While examples are shown below that show some selectable options presented on a display as text options, it will be understood that, in other embodiments, the selectable options can be presented as icons or other graphical representations on the display.

While examples are shown below of particular groupings of selectable options on a display, it will be understood that the selectable options can be grouped in other ways, and the selectable options shown can be replaced by other similar selectable options without departing from the invention described herein.

As used herein, the term "TAP" is used to describe a tactile press upon a computer display in a so-called "touch screen" arrangement.

While examples are described below for which a selection from among selectable options is made with a TAP, it should be understood that other means and other techniques of making a selection from among selectable options are possible. For example, it is known that selections can be made upon some computer displays by way of positioning a cursor upon a selection followed by some manual operation such as pressing a keyboard key or clicking a mouse button. The methods and techniques described herein are not limited to any one form of making a selection.

As used herein, the term "venue" is used to describe both a specific function, e.g., a concert, at a specific location at a specific date and time, but also to describe a location on a map having no surrounding function.

It should be appreciated that FIGS. 1, 5, 8, 11, 12, and 14 show flowcharts corresponding to the below contemplated technique which would be implemented in a computing device represented by computer displays shown in FIGS. 2, 3, 4, 6, 7, 9, 10, 13, and 15. Rectangular elements (typified by element 12 in FIG. 1), herein denoted "processing blocks," represent computer software instructions or groups of instructions. Diamond shaped elements (typified by element 530 in FIG. 5), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC).

The flow diagrams do not depict the syntax of any particular programming language. Rather, the flow diagrams illustrate the functional information one of ordinary skill in the art requires to fabricate circuits or to generate computer software to perform the processing required of the particular computing device. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Figure 2:
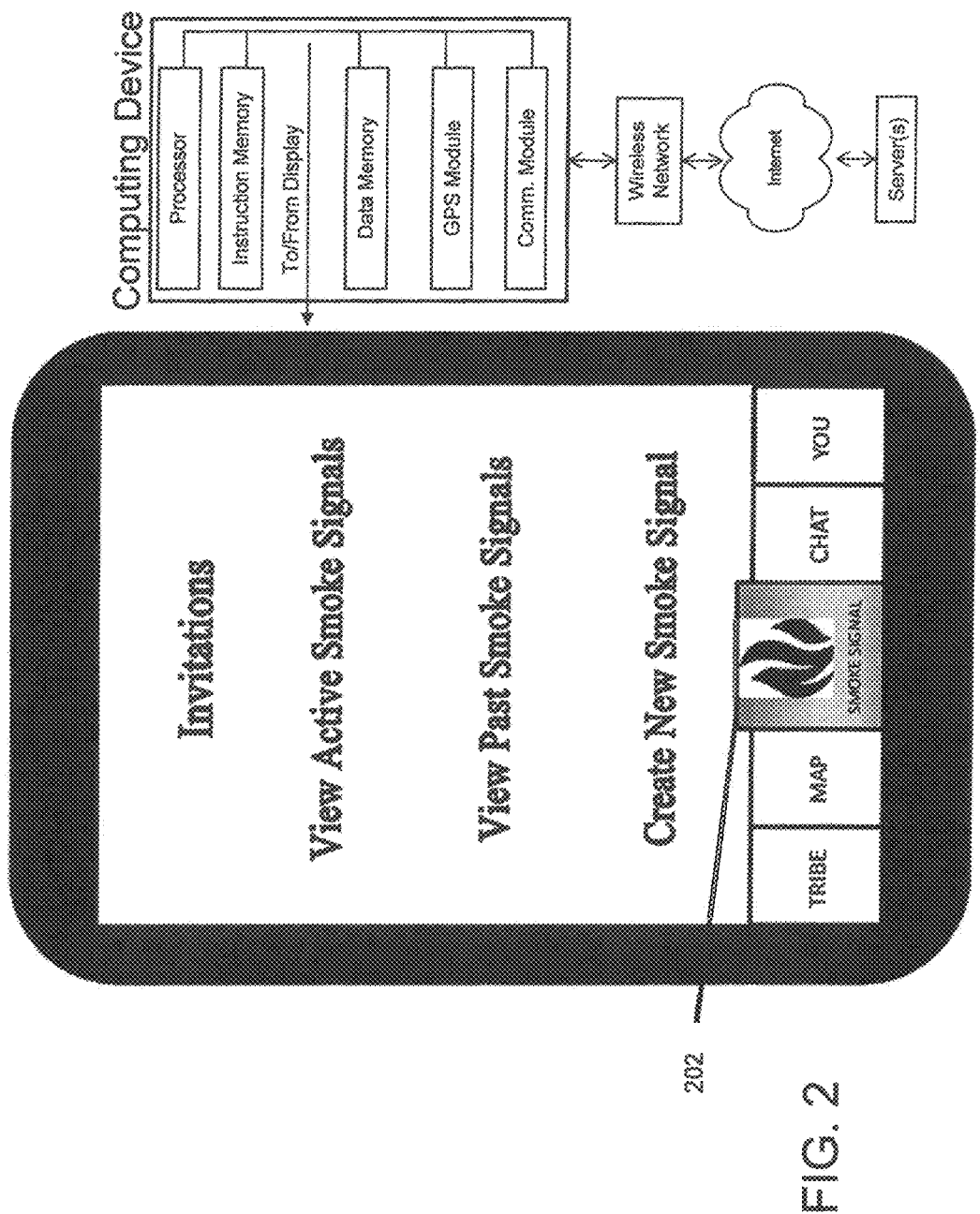
FIG. 2 is a pictorial diagram showing a computer display, for example, a display upon a smart telephone, that can be generated in conjunction with the method of FIG. 1.

Referring to FIG. 1, a method 10 of arranging a physical meeting between people begins at block 12. At block 12 a user can select, upon a computer display, an option corresponding to a so-called "smoke signal." The smoke signal is described above. The selection of this option is shown as element 94 and also in FIG. 2 below. Referring briefly to FIG. 2, there it is shown that the selection of the smoke signal option is made upon a menu of options that are horizontally disposed at the bottom of a display. However, as described above, other means and other presentations for selection of the smoke signal option are possible.

At block 14, upon selection of smoke signal option at block 12, a set of options for selection can be presented, for example, as a drop-down menu. The selectable options are also described below in conjunction with FIG. 2. One of the selectable options can be representative of making a new smoke signal.

At block 16, the selectable option representative of making a new smoke signal is selected by way of a TAP upon the selectable option upon the display.

At block 18, a set of options for selection can be presented, for example, as a drop-down menu. One of the selectable options can be representative of a selection of a venue at which a meeting between people can take place and another one of the selectable options can be representative of the selection of a city in which the meeting will take place. Other selectable options are also possible. In some embodiments, the list of venues can be acquired from another application program, for example, Foursquare®.

At block 20, the selectable option representative of venue is selected by way of a TAP upon the selectable option upon the display.

At block 22, a set of options for selection can be presented, for example, as a drop-down menu. One of the selectable options can be a selection of a city.

At block 24, the selectable option representative of the city is selected by way of a TAP upon the selectable option upon the display.

At block 26, a set of options for selection can be presented, for example, as a drop-down menu. The selectable options can correspond to a list of city names.

At block 28, the selectable option representative of a specific city can be selected by way of a TAP upon the selectable option upon the display. Alternatively, but not shown, a city name can be entered upon the display by way of a touch screen keypad.

At block 30, a set of options for selection can be presented, for example, as a drop-down menu. The selectable options can include a listing of specific venues, for example, theaters or events, at the city selected at block 28. However, in other embodiments, the venue can merely be an address.

At block 32, the selectable option representative of a specific venue can be selected by way of a TAP upon the selectable option upon the display. Alternatively, but not shown, a venue name can be entered upon the display by way of a touch screen keypad.

At block 34, a map of the venue automatically appears upon the display of the computing device. In some embodiments, a plurality of maps is stored within a memory within the computing device. However, in other embodiments, the map of the venue is automatically downloaded to the computing device over a wired or wireless network from a central location. To this end, the computing device communicates to and from the central location. In some embodiments, the map can be acquired from another application program, for example, Foursquare® or MapQuest®.

It will be understood that the map of the venue can be representative of the relatively small physical area, for example, a small theater showing seating and the like, or the map of the venue can be representative of relatively large physical area, for example seating and other areas within a large baseball park.

At block 36, the user the user can zoom in or zoom out the view of the map of the venue, for example, by placing two fingers upon the display and spreading or un-spreading the fingers.

At block 38, by way of a TAP upon the display at a desired location of a meeting between people, a user can select the desired location.

At block 40, an icon can appear on the computing device, and upon the map of the venue, at this selected desired location of the meeting. In some embodiments, the icon can have the appearance of fire or smoke or both. Accordingly, the icon is referred to herein as a smoke signal. A display showing a smoke signal icon is described below in conjunction with FIG. 3. However, any icon can be used.

At block 42, a user can move the smoke signal on the map of the venue on the display. In some embodiments the user can move the icon by touching the icon on the display and sliding the icon to a new location.

At block 44, the user can select the placed smoke signal with a TAP upon the placed smoke signal on the display.

At block 46, a set of options for selection can be presented, for example, as a drop-down menu. The selectable options can include a selectable option corresponding to when the desired meeting is to occur. Some such selectable options are described below in an exemplary display in conjunction with FIG. 4.

At block 48, the selectable option representative of when the meeting is to take place is selected by way of a TAP upon the corresponding selectable option upon the display.

At block 50, a touch screen keypad can appear upon the display.

At block 52, by way of the touch screen keypad, the user can enter information, for example, corresponding to a date, a time, and a duration of the meeting.

At block 54, the user can again select the placed smoke signal with a TAP upon the placed smoke signal on the display.

At block 56, a set of options for selection can be presented, for example, as a drop-down menu. The selectable options can include a selectable option corresponding to who will attend the meeting. Some such selectable options are described below in conjunction with FIG. 4.

At block 58, the selectable option representative of who will attend the meeting is selected by way of a TAP upon the corresponding selectable option upon the display.

At block 60, a set of options for selection can be presented, for example, as a drop-down menu. The selectable options can include a selectable option corresponding to a so-called "tribe." As described above, a tribe is an identified group of people.

At block 62, the selectable option representative of a tribe is selected by way of a TAP upon the corresponding selectable option upon the display.

At block 64, a set of options for selection can be presented, for example, as a drop-down menu. The selectable options can include a list of names of tribes.

At block 66, the selectable option representative of a specific desired tribe is selected by way of a TAP upon the corresponding selectable option upon the display.

At block 68, the user can again select the smoke signal by way of a TAP upon the smoke signal upon the display.

At block 70, a set of options for selection can be presented, for example, as a drop-down menu. The selectable options can include a selection to "lock" option to lock the smoke signal. Some such selectable options are described below in conjunction with FIG. 4.

At block 72, the selectable option to lock the smoke signal is selected by way of a TAP upon the corresponding selectable option upon the display.

The option to lock the smoke signal can correspond to a function that does not allow other people to whom the smoke signal will be communicated to change one or more aspects of the smoke signal, i.e., the meeting. For example, if the smoke signal is locked, other people who receive the smoke signal may not be able to add or subtract people to or from the meeting. Other aspects can also be locked by the originator of the smoke signal.

At block 74, the user can again select the smoke signal by way of a TAP upon the smoke signal upon the display.

At block 76, a set of options for selection can be presented, for example, as a drop-down menu. The selectable options can include a selection to turn on or off (i.e., lock) GPS (global positioning system) tracking to the tribe members selected above in conjunction with block 62. Some such selectable options are described below in conjunction with FIG. 4.

At block 78, the selectable option to turn on or off (i.e. lock) GPS tracking is selected by way of a TAP upon the corresponding selectable option upon the display.

While certain characteristics of the smoke signal and of the meeting are described above, it will be understood that other characteristics of the smoke signal can also be selected by way of other drop-down menus and/or other selections.

Figure 4:
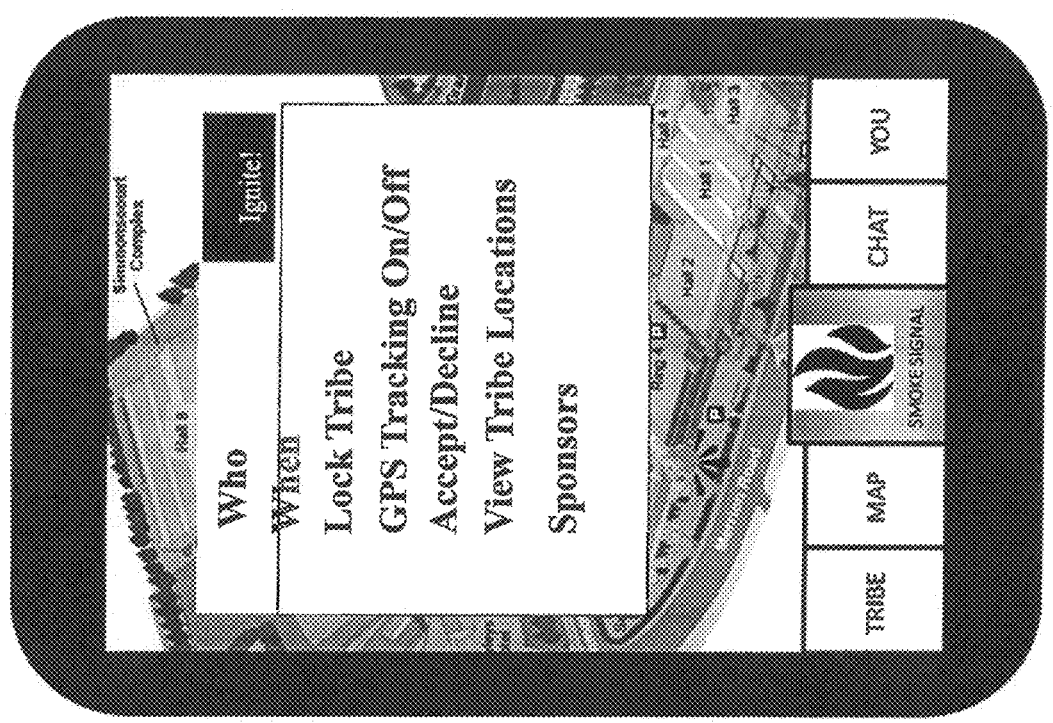
FIG. 4 is a pictorial diagram showing another computer display, for example, a display upon a smart telephone, that can be generated in conjunction with the method of FIG. 1.

At block 80, the smoke signal, now completed, can be activated or ignited by way of a TAP upon a corresponding indication upon the display (see, e.g., FIG. 4). When ignited, the smoke signal is communicated, for example, by way of the Internet, which can include wireless links, for example, cellular telephone wireless links, to all of the members of the tribe identified in conjunction with box 66 above.

Blocks 82-82 show steps that can be taken to select a city, resulting in a city map, instead of blocks 20-34. Functions of the blocks will be understood from the discussion above in conjunction with blocks 20-34.

Referring now to FIG. 2, a display, in the form of a display upon a smart cellular telephone, can include a variety of options as a drop-down menu when the smoke signal button 202 at the bottom of the display is pressed by user. This display corresponds to a display that may be generated in response to box 12 of FIG. 1.

A computing device that can generate images upon the display and that can perform functions described herein can include a processor, an instruction memory, and a data memory coupled to the display. Furthermore, the computing device can include a communications module (e.g., a cellular telephone module) and a GPS module coupled to the processor.

Figure 3:
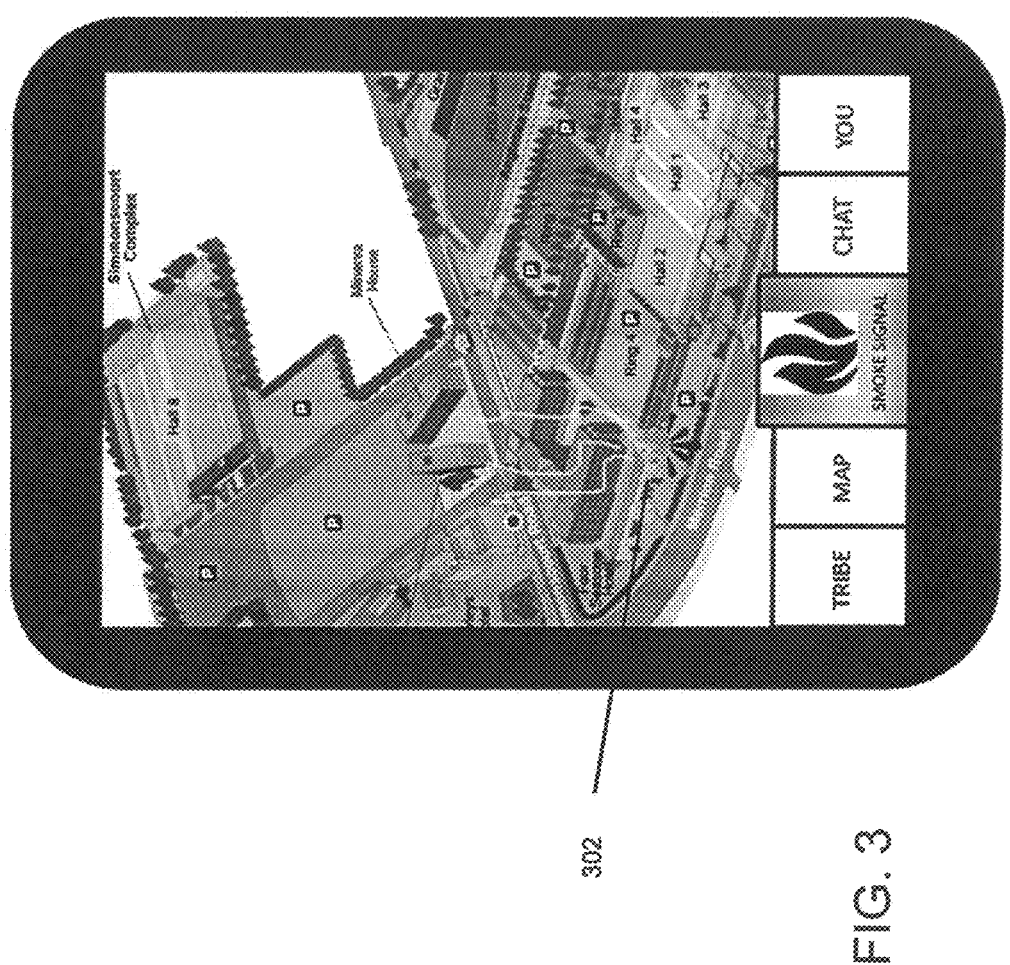
FIG. 3 is a pictorial diagram showing another computer display, for example, a display upon a smart telephone, that can be generated in conjunction with the method of FIG. 1.

It will be understood that a cellular telephone can communicate wirelessly to a cellular network, which may couple (wirelessly or wired) to another network, for example, the Internet, which may, in turn, have computer servers coupled thereto. The servers can have resident thereon features (e.g., software instructions and/or data) described herein, with any partitioning of features (e.g., software instructions and/or data) between the cellular telephone and the servers. Notably, maps described herein may originally reside on the servers and may be downloaded to the cellular telephone. In some embodiments, the maps can be associated with another application program, for example, Foursquare® or MapQuest®. However, in other embodiments, the maps can be associated with the application program described herein.

Where the computing device used to display information described herein is not a cellular telephone, still the computing device can communicate through a network, for example, the Internet, with servers also coupled to the network Referring now to FIG. 3, a display shown is representative of a display that may appear in response to box 40 of FIG. 1. Here is shown a smoke signal icon 302 (or simply a smoke signal) upon a map. As described above in conjunction with FIG. 1, the smoke signal 302 is representative of a meeting that is requested by user at the location on the map. Associated with the meeting is a variety of information described above in conjunction with FIG. 1. For example, the information can include a date of the meeting, a time of the meeting, a duration of the meeting, a venue of the meeting, a specific physical place of the meeting, and who will attend the meeting. Such information can be viewed by recipients of the smoke signal in ways described more fully below.

Referring now to FIG. 4, a display is representative of a display that may appear in response to boxes 44, 54, 68, 74 of FIG. 1 when the smoke signal is TAPed upon the display by the originator of the smoke signal, and also when TAPed by recipient of the smoke signal as described more fully below.

Figure 5:
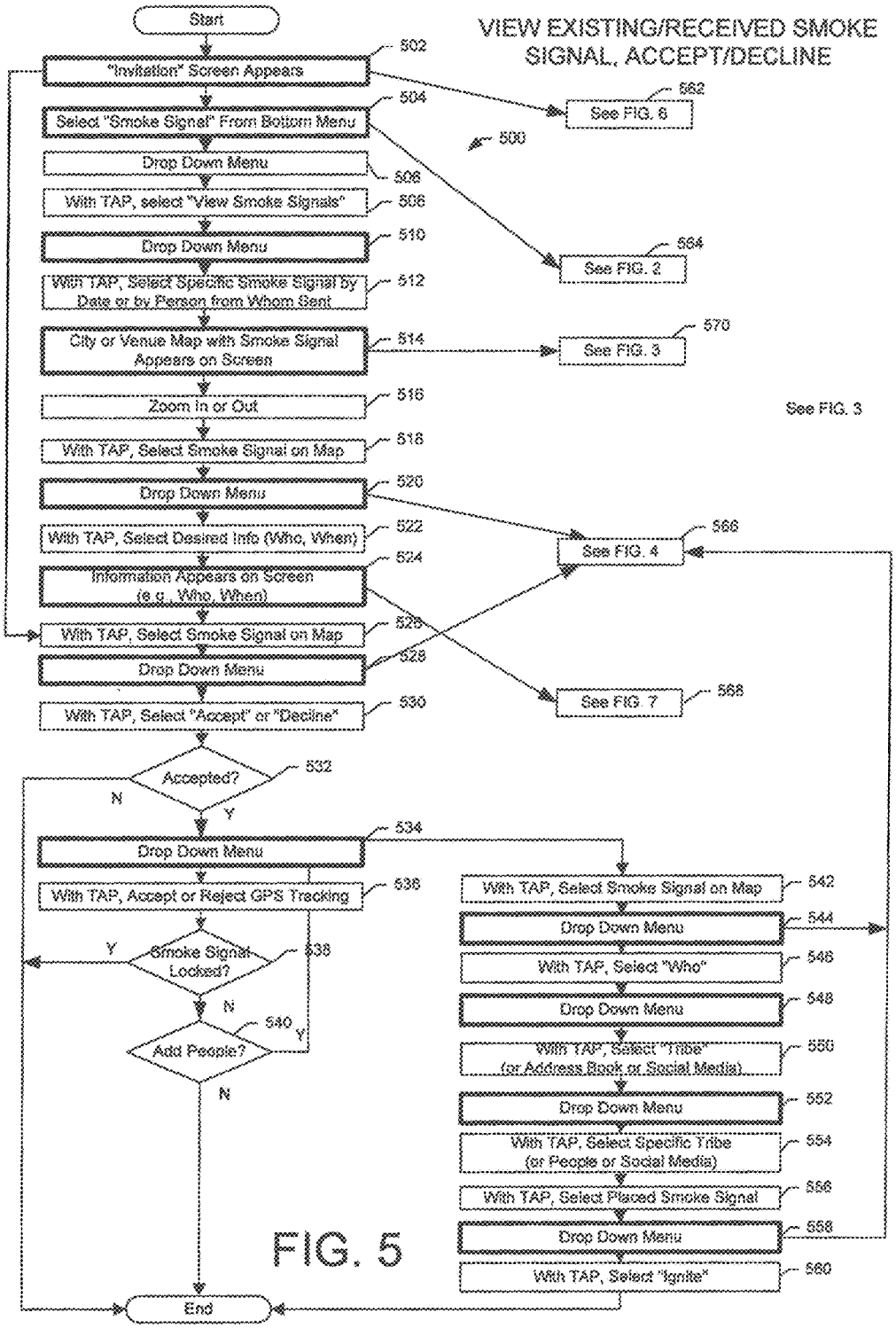
FIG. 5 is a flow chart showing a method of viewing an existing smoke signal.

Referring now to FIG. 5, a method 500 can correspond to actions that a recipient of the smoke signal can take, some of which the originator of the smoke signal can also take, and views that the recipient can see upon his display.

Figure 6:
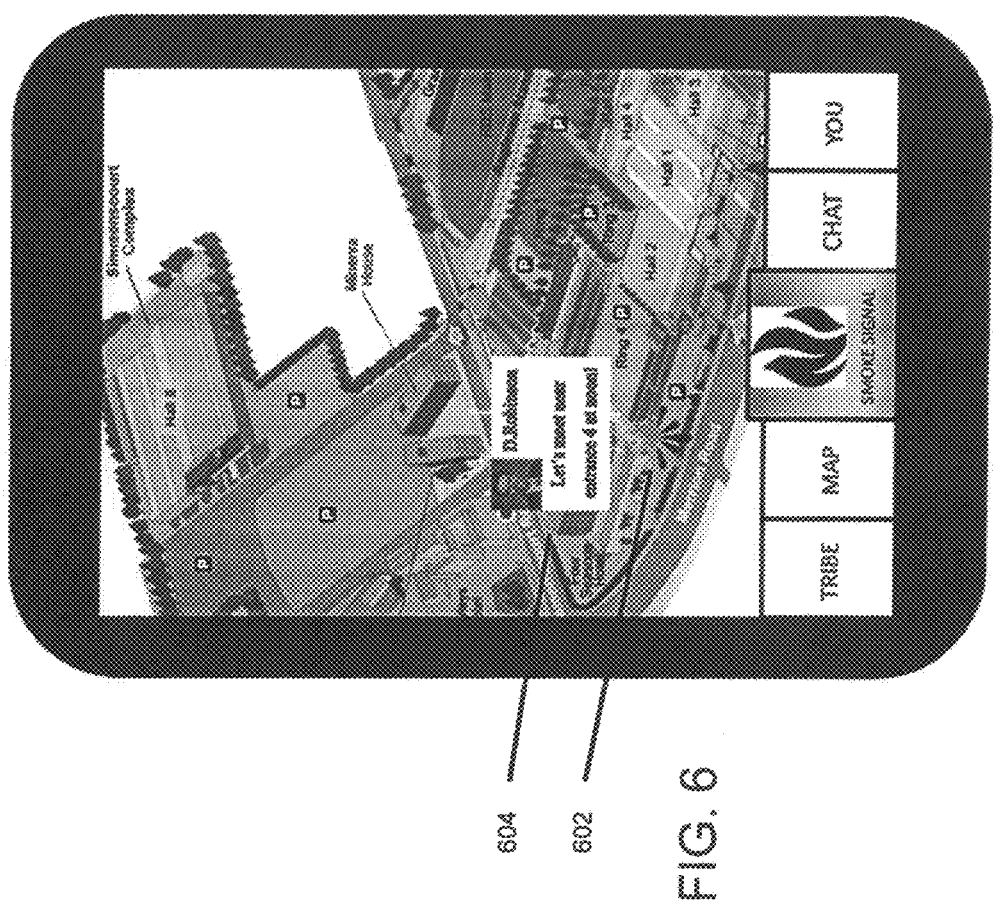
FIG. 6 is a pictorial diagram showing a computer display, for example, a display upon a smart telephone, that can be generated in conjunction with the method of FIG. 5.

The method 500 begins at block 502. At block 502 a so-called "invitation" can appear on the computer display of each one of the recipients, i.e., each member of the tribe, to which a smoke signal is communicated at block 80 of FIG. 1. An exemplary invitation is described below in conjunction with FIG. 6. Referring briefly to FIG. 6, an invitation can include a view of the map selected by the originator of the smoke signal at blocks 32, 86 of FIG. 1. Invitation can also include an icon and text information 604 indicative of the originator of the smoke signal and other text information the originator may wish to communicate. The view can also include the map and the smoke signal 602 associated with the meeting and communicated by the originator of the smoke signal.

At block 504, a recipient can select the option for smoke signal at the bottom of the display.

At block 506, a set of options for selection can be presented to the recipient, for example, as a drop-down menu. The selectable options can include an option to view invitations corresponding to smoke signals. Exemplary selectable options are described below in conjunction with FIG. 4.

At block 508, the selectable option to view invitations is selected by way of a TAP upon the corresponding selectable option upon the display.

At block 510, a set of options for selection can be presented to the recipient, for example, as a drop-down menu. The selectable options can include a listing of one or more invitations for smoke signals that have been received by the recipient.

At block 512, the recipient can select an invitation (i.e., a smoke signal) from among the one or more invitations signals.

At block 514 a city or venue map can appear on the screen of the recipient along with a smoke signal icon corresponding to the invitation. The display can be the same as or similar to the display described above in conjunction with FIG. 3.

At block 516, the recipient of the smoke signal can zoom in or out on the map using techniques described above.

At block 518, the recipient can select the smoke signal by way of a TAP upon the smoke signal upon the display.

At block 520, a set of options for selection can be presented to the recipient, for example, as a drop-down menu. The selectable options can include an option by which the recipient can obtain further information about the invitation. An exemplary drop-down menu is described above in conjunction with FIG. 4.

At block 522, the recipient can select the type of information that he/she wishes to see, for example, who are the meeting attendees and/or when is the meeting.

At block 524 a listing of information can appear upon the display of the recipient. The information can include, but is not limited to a listing of a so-called "chief," who is the originator of the smoke signal, the date, any time, a duration of the meeting associated with the invitation and with the smoke signal, and a listing of people to whom invitation or smoke signal applies. An exemplary display is described below in conjunction with FIG. 7.

At block 526, the recipient can again select the smoke signal on the map on the display.

At block 528, a set of options for selection can be presented to the recipient, for example, as a drop-down menu. The selectable options can include an option by which the recipient can accept or decline an invitation, i.e., a received smoke signal. An exemplary drop-down menu is described above in conjunction with FIG. 4.

At block 530, the recipient can accept or decline the invitation, i.e., the smoke signal, by way of a TAP upon the selected option upon the display.

At block 532, if the recipient accepts invitation, the process proceeds to block 534. At block 534, another drop-down menu of selectable options can be presented to the user. The selectable options can include an option for the recipient to accept or reject GPS tracking of his movements.

At block 536, the recipient can accept or reject GPS tracking of his movements with a TAP upon the selected option upon the display. The display can revert automatically to the smoke signal display showing the smoke signal upon the map.

At block 538, if the smoke signal was not locked by the originator of the smoke signal, the process proceeds to block 540.

At block 540 if the recipient chooses to add people to the meeting, the process proceeds to block 542.

At block 542, the recipient can again select the smoke signal on the map on the display.

At block 544, a set of options for selection can be presented to the recipient, for example, as a drop-down menu. The selectable options can include an option to show who has been invited to the meeting associated with the smoke signal. An exemplary drop-down menu is described above in conjunction with FIG. 4.

At block 546, the user can select the option to show who is been invited to the meeting.

At block 548, another set of options for selection can be presented to the recipient, for example, as a drop-down menu. The options for selection can include options to select tribes, an address book, or social media, for example, Facebook®. Use of social media is described more fully below.

At block 550, the user can select an option for tribes, address book, or social media.

At block 552, another set of options for selection can be presented to the recipient, for example as a drop-down menu. The options for selection can include a listing of specific tribes, specific people, or specific social media (e.g., from which to import contact information), depending on which one of those options was selected at block 550.

At block 554, the user can select, by way of a TAP upon the display, a specific tribe, specific people, or a specific social medium, depending on which one of those options selected at block 550.

At block 556, the recipient can again select the smoke signal on the map on the display.

At block 558, a set of options for selection can be presented to the recipient, for example, as a drop-down menu. The selectable options can include an option to re-ignite (i.e., ignite) the smoke signal. An exemplary drop-down menu is described above in conjunction with FIG. 4.

At block 560, by way of a TAP upon the display, the user can re-ignite the smoke signal. Re-igniting the smoke signal is similar to igniting the smoke signal described above in conjunction with block 80 of FIG. 1. Re-igniting smoke signal causes smoke signal information to be transmitted to people originally associated with the smoke signal (including the originator), and also to additional people that were added in conjunction with blocks 542-556.

It should be appreciated that, if the smoke signal is not locked by the originator, for example, at block 72 of FIG. 1, then by way of adding people to the meeting and re-igniting the smoke signal, the number of members associated with the meeting can grow depending upon additional people that each person who receives the smoke signal wants to add to the meeting.

At block 532, if the recipient of the invitation does not accept the invitations, then the process ends.

At block 538, if the smoke signal is locked by the originator, then the process ends.

At block 502, the recipient can bypass steps and jump directly to block 526 by selecting the smoke signal or invitation icon with a TAP.

Referring now to FIG. 6, an exemplary display shows an icon 604 upon the map, the map that has been communicated from the originator of the meeting, or by a recipient of the meeting who has invited additional people to the meeting. The display is representative of that which may appear in conjunction with block 502 of FIG. 5.

The display shows the map and the smoke signal 602.

The icon 604 can provide information to the recipient. Here shown, the icon includes a photograph of the person who has communicated the smoke signal to the recipient, a name of the person, and also further text information that the person who communicated the invitations, i.e., the smoke signal, wishes to communicate.

Figure 7:
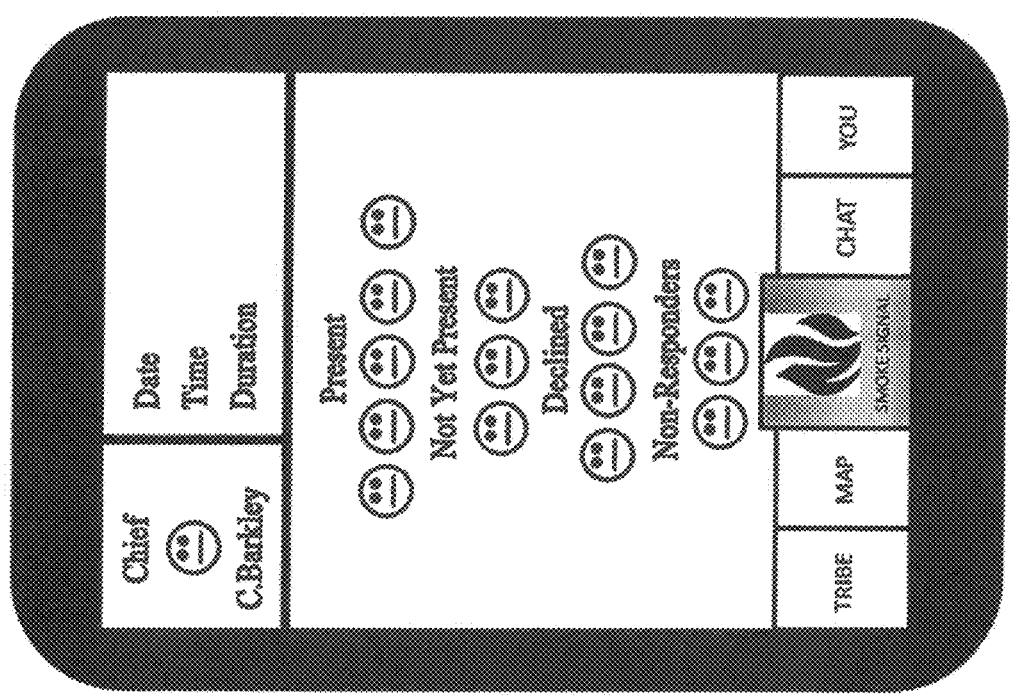
FIG. 7 is a pictorial diagram showing another computer display, for example, a display upon a smart telephone, that can be generated in conjunction with the method of FIG. 5.

Referring now to FIG. 7, an exemplary display shows a graphical representation of information that may be provided to a recipient of the smoke signal, and which can be viewed by way of block 524 of FIG. 5. As described above, information can include, but is not limited to, a listing of a so-called "chief," who is the originator of the smoke signal, the date, the time, and the duration of the meeting associated with the invitation and with the smoke signal, and a listing of people to whom invitation or smoke signal applies.

Of particular use when a meeting associated with the smoke signal is about to occur, the information can also show which members of the meeting are present, which members are not yet present, which members have declined the invitation associated with the smoke signal, and which members have not responded to their receipt of an invitation. The application program can identify which members are present and which members are not yet present by way of the GPS function provided by many computing devices, so long as the GPS function was not locked, and so long and GPS tracking was accepted by the members of the tribe.

In order to identify who was present at the meeting, a distance threshold can be used. For example, a threshold of 100 meters surrounding the specified location of the meeting can be used as a distance threshold. Those members who are within the 100 meter threshold from the location of the meeting, as identified by the GPS function, can be represented on the display as being present, and those not within the hundred meter threshold can be represented as not yet present. However, a distance threshold less than or greater than one hundred meters can also be used. Also, in some embodiments, the user can specify the distance threshold Referring now to FIG. 8, a process 800 is used to create a tribe. The process 800 begins at block 802, where the option for tribe can be selected from the bottom menu on the display. An exemplary display associated block 802 is described more fully below junction with FIG. 9.

At block 804, another set of options for selection can be presented, for example, as a drop-down menu. The options for selection can include an option to make a new tribe.

At block 806, the user can select, by way of a TAP upon the display, the option to make a new tribe.

At block 808, a keypad can appear on the display.

At block 810 the user can enter the name he wishes to associate with the tribe.

At block 812, another set of options for selection can be presented, for example, as a drop-down menu. The options for selection can include an option for who, corresponding to a selection of members of the tribe.

At block 814, the user can select, by way of a TAP upon the display, the options for who is to be a member of the tribe.

At block 816, another set of options for selection can be presented, for example, as a drop-down menu. The options for selection can include an option to select an address book.

At block 818, the user can select, by way of a TAP upon the display, the option for the address book.

At block 820, a user address book can appear on the display. Computer address books will be understood.

At block 822, the user can select specific people from his/her address book, for example, by way of one or more TAPs upon the display to select the people.

At block 824, a display can be presented to the user showing information about the tribe thus created. An exemplary display, showing information about the created tribe, is described below in conjunction with FIG. 10.

At block 826, if, by way of the drop-down menu viewed at block 816, the user selects social media instead of selecting his/her address book, then at block 828 another set of options for selection can be presented, for example, as a drop-down menu. The options for selection can include a listing of specific social media, for example, Facebook® and others.

At block 830, the user can select, by way of a TAP upon the display, a specific social medium.

At block 832, by way of functions associated with the selected social medium, the user can select social media members. The process proceeds to block 824.

Figure 8:
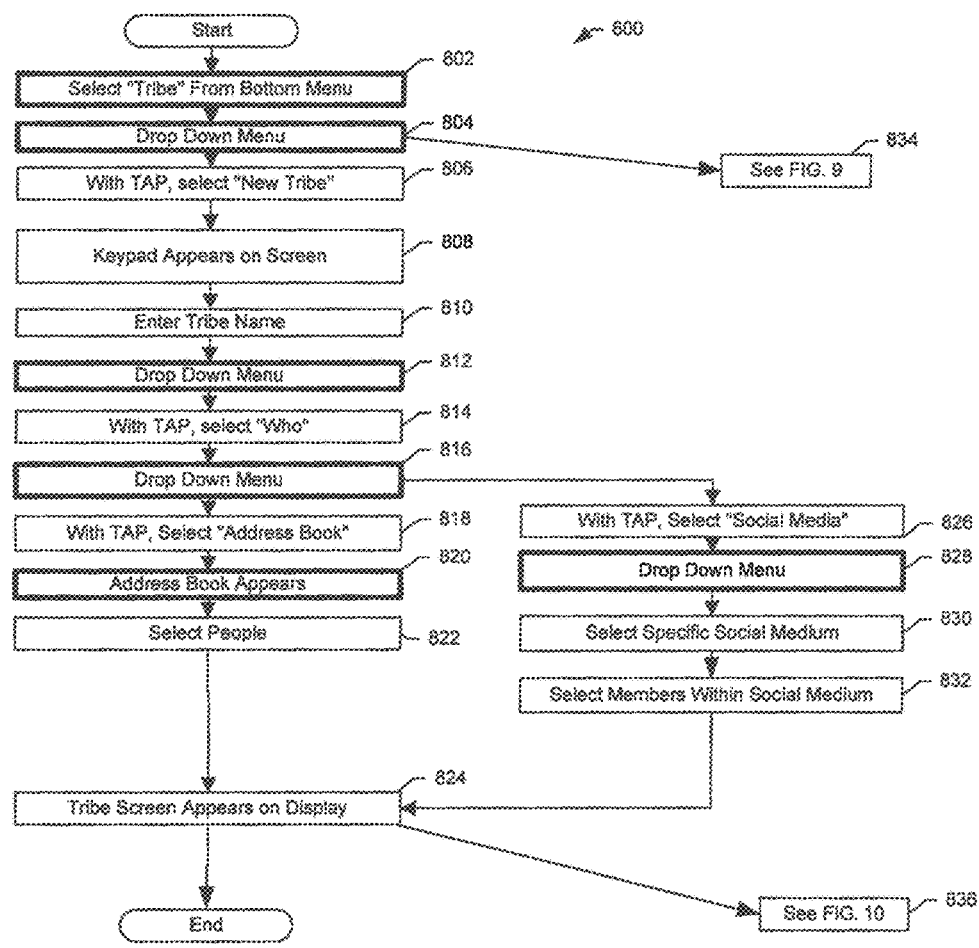
FIG. 8 is a flow chart showing a method of creating a so-called "tribe"
Figure 9:
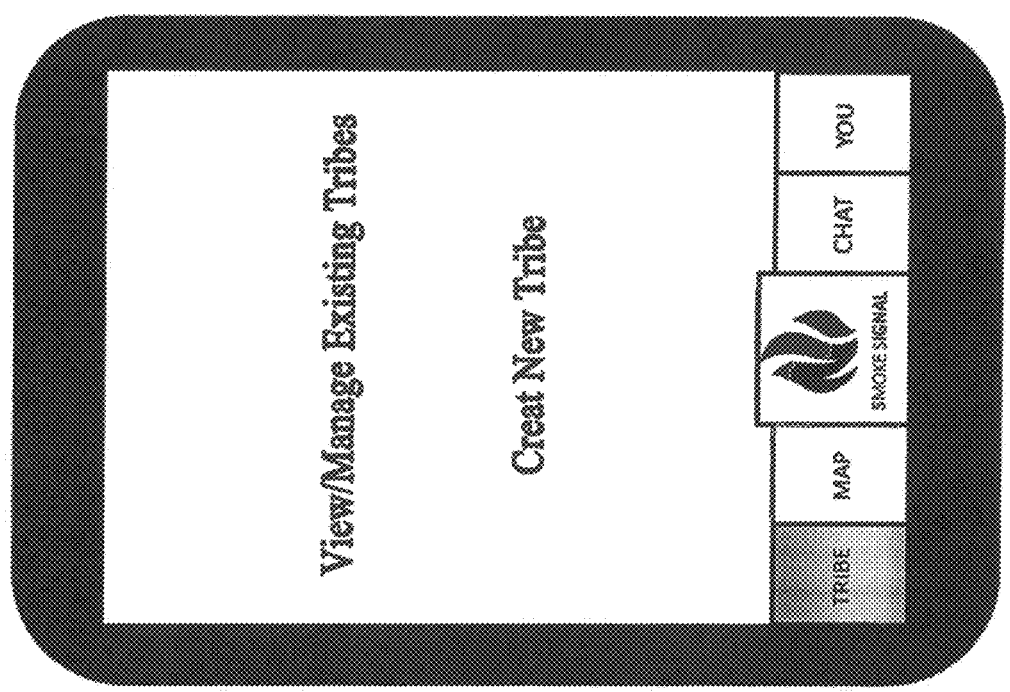
FIG. 9 is a pictorial diagram showing a computer display, for example, a display upon a smart telephone, that can be generated in conjunction with the method of FIG. 8.

Referring now to FIG. 9, an exemplary display shows a graphical representation of information that may be provided by way of block 802 of FIG. 8, when the tribe button at the bottom of the display is activated. Options for selection can include an option to create a new tribe an option to view or manage existing tribes. Other options are also possible.

Figure 10:
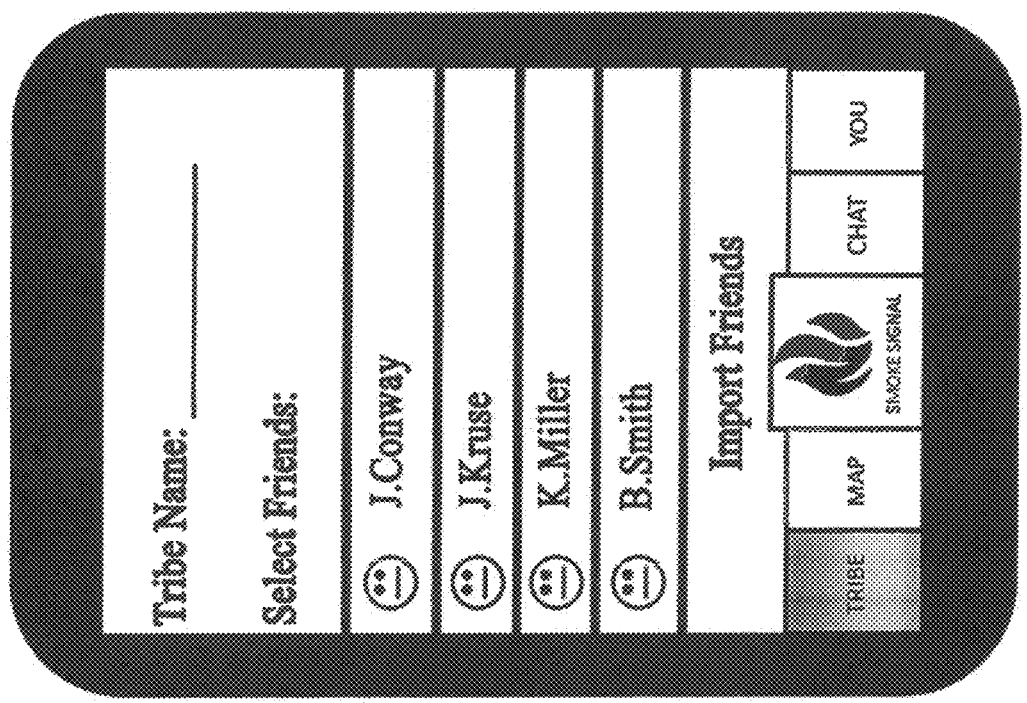
FIG. 10 is a pictorial diagram showing another computer display, for example, a display upon a smart telephone, that can be generated in conjunction with the method of FIG. 8.

Referring now to FIG. 10, an exemplary display shows a graphical representation of a tribe as may be viewed in conjunction with block 824 of FIG. 8.

Figure 11:
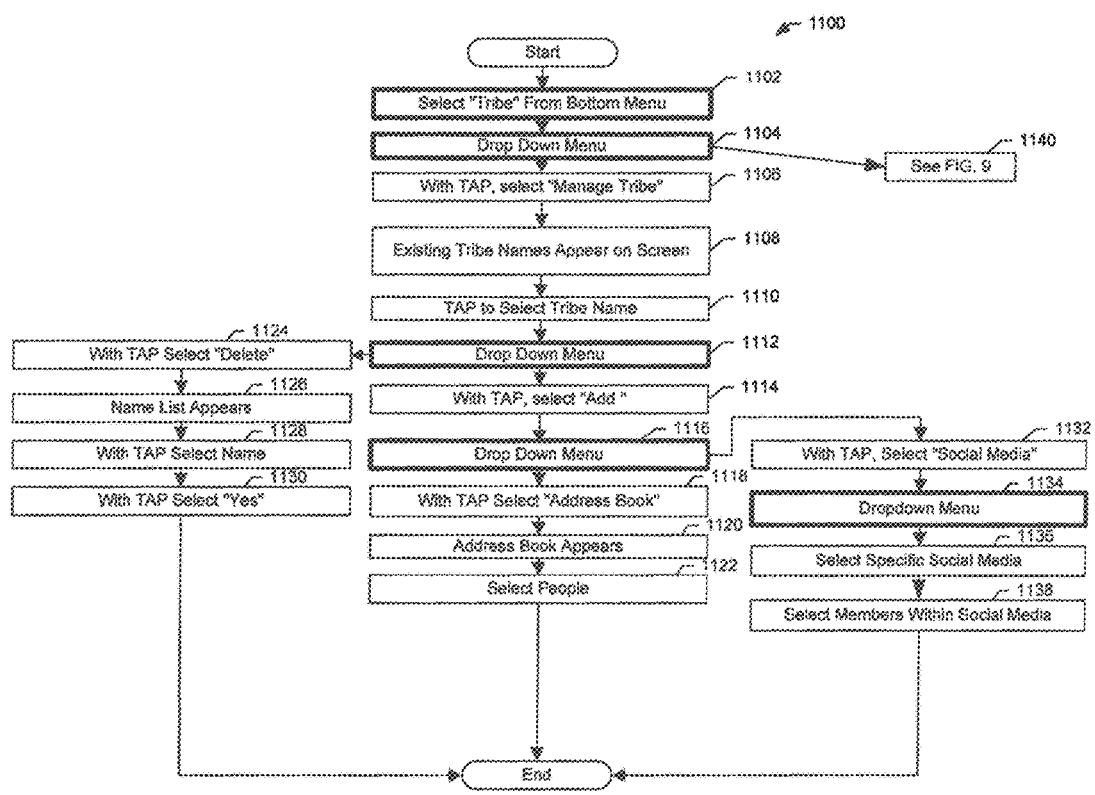
FIG. 11 is a flow chart showing a method of managing a tribe.

Referring now to FIG. 11, a process 1100 shows a method of managing a tribe previously created. The process begins at block 1102 where the option for tribe can be selected from a menu along the bottom of the display. An exemplary display associated with block 1102 is described above in conjunction with FIG. 9.

At block 1104, another set of options for selection can be presented, for example, as a drop-down menu. The options for selection can include an option to view or manage an existing tribe At block 1106, the user can select, by way of a TAP upon the display, the options to view or manage an existing tribe.

At block 1108, a listing of tribe names appears on the display.

At block 1110, the user can select, by way of a TAP upon the display, a specific tribe name from among the names of tribes.

At block 1112, another set of options for selection can be presented, for example, as a drop-down menu. The options for selection can include options to add or delete names from the tribe.

At block 1114, the user can select, by way of a TAP upon the display, the option to add names to the tribe.

At block 1116, another set of options for selection can be presented, for example, as a drop-down menu. The options for selection can include options of address book or social media.

At block 1118, the user can select, by way of a TAP upon the display, the option for address book.

At block 1120, and address book can appear on the display.

At block 1122, the user can select, by way of one or more TAPs upon the display, one or more people from the address book.

At block 1132, if the user instead selects the option for social media at block 1116, then at block 1134, another set of options for selection can be presented, for example, as a drop-down menu. The options for selection can include a list of specific social media.

At block 1136, the user can select, by way of a TAP upon the display, one of the listed social media.

At block 1138, the user can select members to include in the tribe by way of functions associated with the selected social medium.

At block 1124, the user can instead select, by way of a TAP upon the display, an option to delete members from the tribe.

At block 1126, a name list can appear on the display. The name list can be the same as or similar to the tribe list described above in conjunction with FIG. 10.

At block 1128, the user can select, by way of one or more TAPs upon the display, the names of one or more people to delete from the tribe.

At block 1130, the user can make an affirmative decision to delete the people selected at block 1128, for example, by way of selecting, by way of a TAP upon the display, the selection "Yes."

Figure 12:
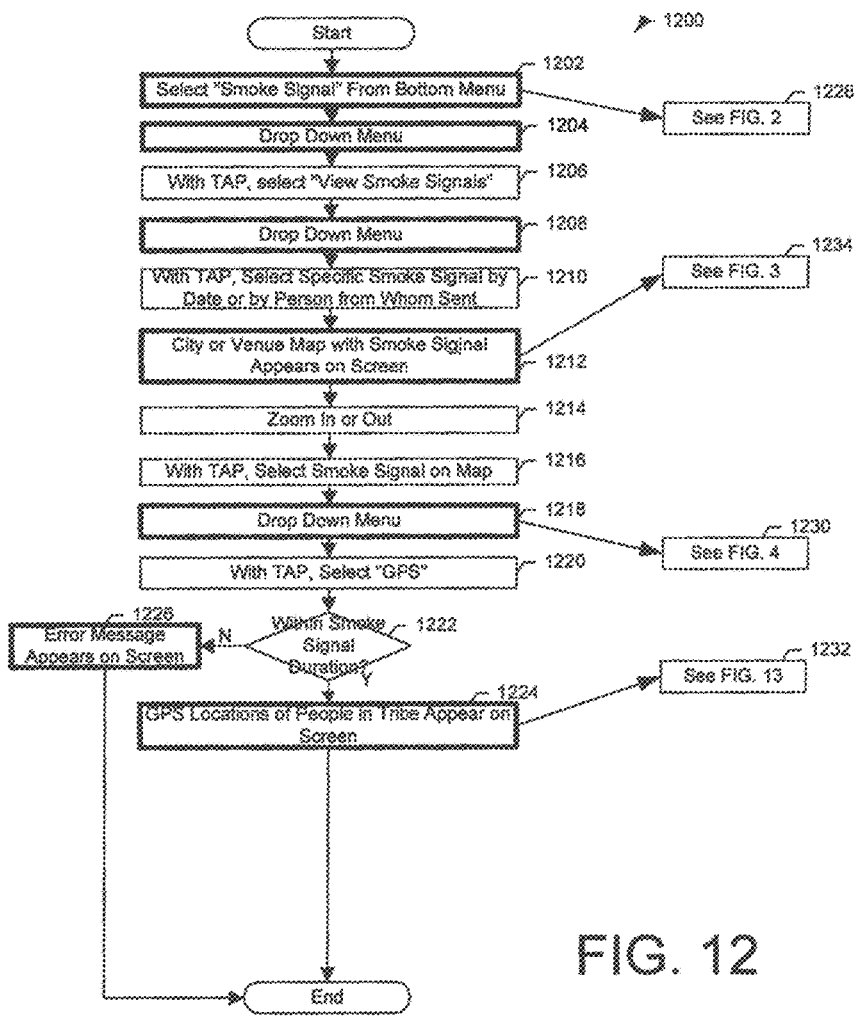
FIG. 12 is a flow chart showing a method of viewing a smoke signal and of identifying a GPS location of people within the tribe.

Referring now to FIG. 12, a method 1200 of identifying where tribe members are when the meeting associated with smoke signal is about to take place begins at block 1202. At block 1202 a user can select the option of smoke signal from the menu at the bottom of the screen.

At block 1204, a set of options for selection can be presented, for example, as a drop-down menu. The options for selection can include an option to view current or past smoke signals, i.e., meetings. This menu is shown and described above in conjunction with FIG. 2.

At block 1206, the user can select, by way of a TAP upon the display, the option to view active smoke signals.

At block 1208, another set of options for selection can be presented, for example, as a drop-down menu. The options for selection can include a list of current and future smoke signals, i.e., meetings.

At block 1210, the user can select, by way of a TAP upon the display, a specific one of the listed smoke signals, i.e., meetings. In particular, the user can select a meeting that is about to happen At block 1212, either the city or venue map appears on the display of the user. A smoke signal icon appears on the display at the location of the meeting on the venue or city map. An exemplary display is described above in conjunction with FIG. 3.

At block 1214, the user can zoom in or out in the map display using techniques described above.

At block 1216, the user can select the smoke signal by way of a TAP upon the smoke signal upon the display.

At block 1218, a set of options for selection can be presented to the user, for example, as a drop-down menu. The selectable options can include an option by which the user can view locations of the tribe members, which allows the user to view on the map locations of tribe members associated with smoke signal.

At block 1220, the user can select, by way of a TAP upon the display, the option to view the tribe member locations . . . .

In some embodiments, the GPS function includes privacy characteristics. For example, in some embodiments, only tribe members within a predetermined threshold distance of the location represented by the smoke signal can be viewed on the display. For example the predetermined threshold distance can be one kilometer. However, in other embodiments, the predetermined threshold distance can be more than one kilometer or less than one kilometer.

The GPS function can also include privacy characteristics described above, for example, in conjunction with block 536 of FIG. 5. At block 536, is described that a recipient of the smoke signal can refuse to have his location identified by way of the GPS function.

Block 1222 is representative of yet another privacy characteristic of the GPS function. At block 1222, it is automatically determined if the real-time is within the duration of the smoke signal specified, for example, at block 52 of FIG. 1. If the real-time is within the duration of the smoke signal, the process continues to block 1224. A time margin threshold can also be used to provide and extended duration window extending beyond the duration of the smoke signal by a predetermined amount.

At block 1224, GPS locations of people in the tribe associated with the smoke signal selected at block 1210 are shown on the display. An exemplary display of GPS locations is described below in conjunction with FIG. 13.

If, at block 1222, the real-time is not within smoke signal duration (as may be extended by the time margin threshold described above), then, in some embodiments, at block 1226, an error message can appear on the display indicating that the user is unable at that time to view GPS locations on the display.

Figure 13:
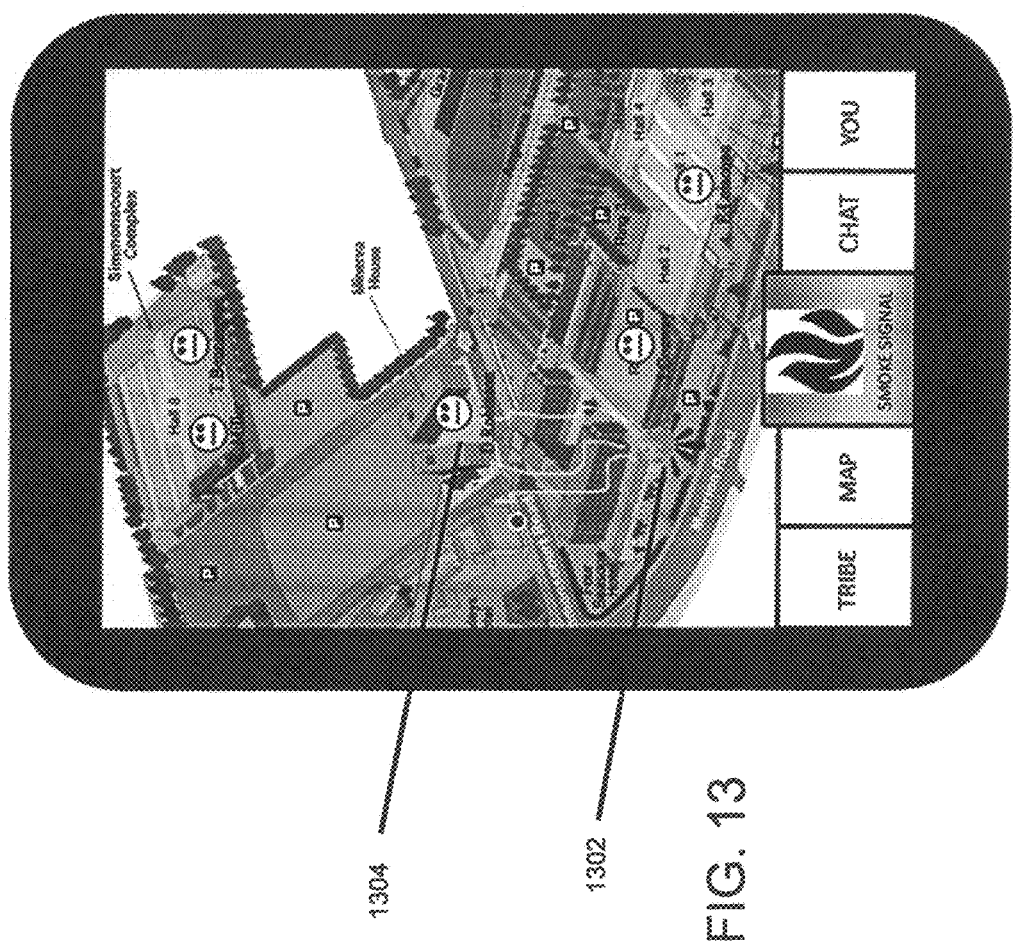
FIG. 13 is a pictorial diagram showing a computer display, for example, a display upon a smart telephone, that can be generated in conjunction with the method of FIG. 12.

Referring now to FIG. 13, an exemplary display, which can be associated with block 1224 of FIG. 12, shows a view including a map, including an icon 1302 representative of the smoke signal, the smoke signal indicative of a physical location of a meeting, and icons, for example, an icon 1304, representative of GPS locations of tribe members associated with smoke signal 1302. With this function each tribe member is able to view physical positions of the other tribe members. Specific tribe members can be identified on the display with text information, photographs, or other means.

Figure 14:
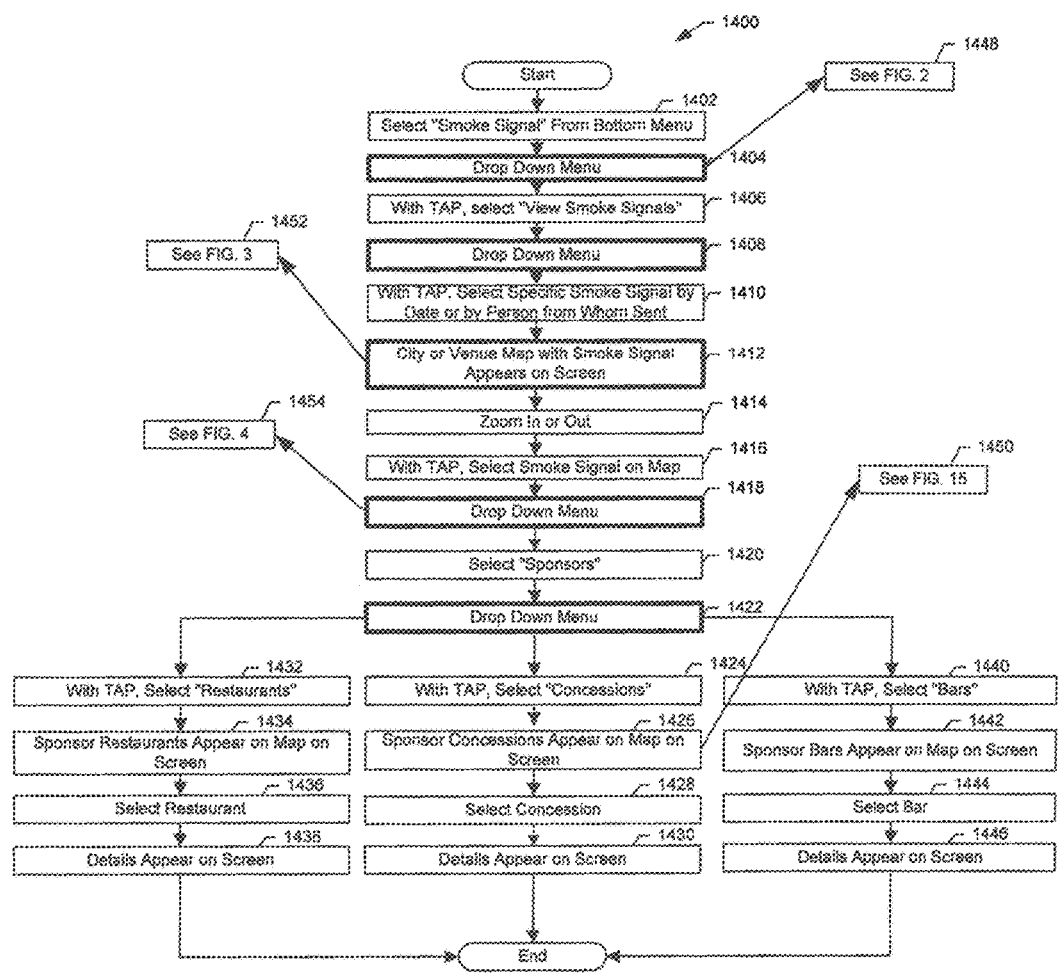
FIG. 14 is a flow chart showing a method of viewing member businesses proximate to a location of a smoke signal.

Referring now to FIG. 14, a method 1400 provides a means by which tribe members attending a meeting associated with a smoke signal can view selected establishments (i.e., members or subscribers) proximate to the location of the meeting.

It will be understood that many computer application programs seek to obtain a profit. Some computer application programs obtain a profit by way of advertising, the advertising obtained from a wide variety of the advertisers. As will become apparent from discussion below, for the present application program, various sorts of establishments and businesses may pay for services associated with the application program described herein.

The method 1400 begins at block 1402. At block 1402, a user can select the option of smoke signal from the menu at the bottom of the screen.

At block 1404, a set of options for selection can be presented, for example, as a drop-down menu. The options for selection can include an option to view current or past smoke signals, i.e., meetings. An exemplary display of the drop-down menu a block 1404 is described above in conjunction with FIG. 2.

At block 1406, the user can select, by way of a TAP upon the display, the option to view current smoke signals.

At block 1408, a set of options for selection can be presented, for example, as a drop-down menu. The options for selection can include a list of current and future smoke signals, i.e., meetings.

At block 1410, the user can select, by way of a TAP upon the display, a specific one of the listed smoke signals, i.e., meetings. In particular, the user can select a meeting that is about to happen At block 1412, either the city or venue map appears on the display of the user. A smoke signal icon appears on the display at the location of the meeting on the venue or city map. An exemplary display is described above in conjunction with FIG. 3.

At block 1414, the user can zoom in or out in the map display using techniques described above.

At block 1416, the user can select the smoke signal by way of a TAP upon the smoke signal upon the display.

At block 1418, a set of options for selection can be presented to the user, for example, as a drop-down menu. The selectable options can include an option by which the user can view sponsors. An exemplary display of the drop-down menu a block 1418 is described above in conjunction with FIG. 4.

At block 1420, the user can select, by way of a TAP upon the display, the option to view the sponsors.

Sponsors can be establishments that have paid money, either directly or indirectly, to the developer of the application program described herein for the right to be listed as sponsors. Three types of sponsors are described below. However virtually any type of sponsors can be included in the sponsors of this application program. Also, people or establishments who have not paid money can also be listed under some circumstances.

In some embodiments, sponsors can pay more money or can otherwise provide a discount to customers who present smoke signals with at least predetermined numbers of members in a tribe associated with a smoke signal for which they are sponsors.

In some embodiments, there can be different graphical representations of the smoke signal on the screen of a user depending upon how many tribe members have accepted the smoke signal and/or how many tribe members are present at the meeting. For example, the graphical representation can change in size and/or change in color. In some embodiments, points can be given by the application program to the members of smoke signals with large tribes, or by sponsors proximate to a smoke signal with a large tribe. Points given by a sponsor can result in discounts given by the sponsor.

At block 1422, a set of options for selection can be presented to the user, for example, as a drop-down menu. The selectable options can include category names of sponsors. The category names can include, but are not limited to, concessions, restaurants, and bars.

At block 1424, the user can select, by way of a TAP upon the display, the option to view sponsored concessions. Concessions can include, for example, booths at the venue that sell products, for example, T-shirts, food, beverages, alcoholic beverages, CDs.

At block 1426, sponsor concessions appear on the display overlaid on the map of the venue. An exemplary display showing concessions as icons upon a map of the venue is described below in conjunction with FIG. 15.

In some embodiments, the application program automatically selects those concessions that are within a predetermined threshold distance from the smoke signal selected at block 1410. For example the predetermined threshold distance can be one kilometer. However, in other embodiments, the predetermined threshold distance can be less than one kilometer or greater than one kilometer. In some embodiments, the predetermined threshold distance can be automatically tailored in accordance with the type of venue represented by the smoke signal. For example, if the venue is a small venue, for example, a small theater, the predetermined threshold distance can be reduced to, for example, one hundred meters. On the other hand, if the venue is a very large a, for example, Disney World, the predetermined threshold distance can be increased to, for example, five kilometers. In some embodiments, the user can select the predetermined threshold distance by way of menus not further described herein.

At block 1428, the user can select, by way of a TAP upon the display, a specific one of the concessions shown as icons upon the display.

At block 1430, details about the concession can appear on the display. For example, prices, menus, specials, coupons or other details associated with the selected venue can appear.

At block 1422, the user can select different sponsors than concessions. Here shown, in blocks 1432-1438, the user has selected restaurants. In blocks 1440-1446, the user has selected bars. Method steps associated with those other selections will be understood from the discussion above in conjunction with concessions.

Figure 15:
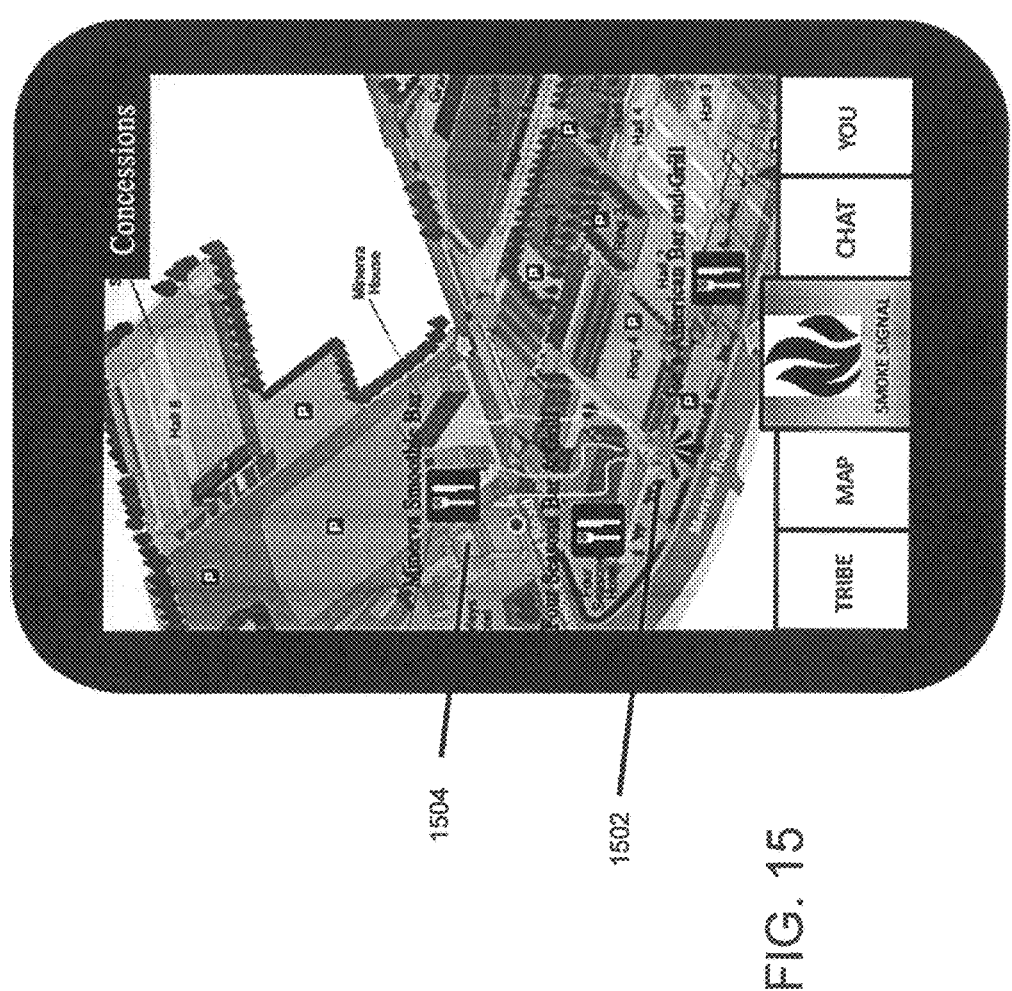
FIG. 15 is a pictorial diagram showing a computer display, for example, a display upon a smart telephone, that can be generated in conjunction with the method of FIG. 14.

Referring now to FIG. 15, a display shows a map of the venue associated with the smoke signal selected at block 1410 of FIG. 14 and shows the smoke signal icon 1502 at the specified location of the meeting on the map. Sponsor or member icons, for example, an icon 1504, representative of locations of restaurants, can appear on the display, for example, in conjunction with block 1434 of FIG. 14.

It will be understood that some aspects of the above-described computer application program and related techniques can reside as instructions within a local computer platform, e.g., a smart cellular telephone. However, it should be also appreciated that some aspects can reside at a central location to which the local computer platform can communicate. For example, the above-described venue maps and lists of the above-described sponsors can be centrally located, for example, on a central server. Other aspects can also be centrally located.

While particular menus and sequences of menus are shown and described above, it will be appreciated that the functions described herein can be operable with different menus and sequences of menus.

Having described preferred embodiments of the invention it will now become apparent to those of ordinary skill in the art that other embodiments incorporating these concepts may be used. Additionally, the software included as part of the invention may be embodied in a computer program product that includes a computer readable storage medium. For example, such a computer readable storage medium can include a readable memory device, such as a hard drive device, a CD-ROM, a DVD-ROM, or a computer diskette, having computer readable program code segments stored thereon. A computer readable transmission medium can include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A computer-implemented method of generating a meeting among people, comprising:
   selecting, with a graphical user interface on a computer display, a venue;
   displaying a map of the venue on the computer display, the map of the venue showing a plurality of internal features inside of the venue;
   selecting a location of the meeting at the venue by dragging and dropping an icon on the map on the displayed venue to a position indicative of a selected spot proximate to one of the plurality of internal features inside of the venue;
   selecting, with a graphical user interface on the computer display, a time of the meeting;
   selecting, with a graphical user interface on the computer display, one or more people to attend the meeting;
   communicating, to the one or more people, information identifying: the map, the selected time, the selected location of the meeting, and the selected one or more people;
   displaying, in accordance with the communicating, the map of the venue on one or more respective computer displays of the one or more people; and
   displaying, in accordance with the communicating, the icon on the map of the venue on the one or more computer displays of the one or more people at the selected location of the meeting.

2. The computer-implemented method of claim 1, wherein the venue comprises a concert Hall.

3. The computer-implemented method of claim 1, wherein the venue comprises an organized event attended by a crowd of people.

4. The computer-implemented method of claim 1, further comprising:
   enlisting a member organization;
   comparing a location of the member organization with the location of the meeting; and
   displaying a member icon representative of the member organization on the map on the computer display at a position representative of the location of the member organization only if the location of the member organization is within a threshold distance of the location of the meeting.

5. The computer-implemented method of claim 4, wherein the member organization comprises a concession associated with the venue.

6. The computer-implemented method of claim 4, wherein the member organization comprises a restaurant.

7. The computer-implemented method of claim 4, wherein the member organization comprises a bar.

8. The computer-implemented method of claim 4, further comprising:
   selecting, with a graphical user interface upon the computer display, the member organization; and
   displaying data on the map upon the computer display in accordance with the selecting the member organization, the data describing a feature of the member organization.

9. The computer-implemented method of claim 4, further comprising:
   discounting to the member organization if one of the one or more people presents a respective computer display indication to the member organization that the one or more people comprises at least a predetermined number of people.

10. A computer-readable storage medium having computer-readable code stored thereon, the computer readable code comprising instructions for:
    selecting, with a graphical user interface on a computer display, a venue;
    displaying a map of the venue on the computer display, the map of the venue showing a plurality of internal features inside of the venue;
    selecting a location of the meeting at the venue by dragging and dropping an icon on the map on displayed venue to a position indicative of a selected spot proximate to one of the plurality of internal features inside of the venue;

selecting, with a graphical user interface on the computer display, a time of the meeting;

selecting, with a graphical user interface on the computer display, one or more people to attend the meeting;

communicating, to the one or more people, information identifying: the map, the selected time, the selected location of the meeting, and the selected one or more people;

displaying, in accordance with the communicating, the map of the venue on one or more respective computer displays of the one or more people; and displaying, in accordance with the communicating, the icon on the map of the venue on the one or more computer displays of the one or more people at the selected location of the meeting.

11. The computer-readable storage medium of claim 10, wherein the venue comprises a concert Hall.

12. The computer-readable storage medium of claim 10, wherein the venue comprises an organized event attended by a crowd of people.

13. The computer-readable storage medium of claim 10, wherein the computer readable code further comprises instructions for:

enlisting a member organization;

comparing a location of the member organization with the location of the meeting; and displaying a member icon representative of the member organization on the map on the computer display at a position representative of the location of the member organization only if the location of the member organization is within a threshold distance of the location of the meeting.

14. The computer-readable storage medium of claim 13, wherein the member organization comprises a concession associated with the venue.

15. The computer-readable storage medium of claim 13, wherein the member organization comprises a restaurant.

16. The computer-readable storage medium of claim 13, wherein the member organization comprises a bar.

17. The computer-readable storage medium of claim 13, wherein the computer readable code further comprises instructions for:

selecting, with a graphical user interface upon the computer display, the member organization; and displaying data on the map upon the computer display in accordance with the selecting the member organization, the data describing a feature of the member organization.

18. The computer-implemented method of claim 13, wherein the computer readable code further comprises instructions for:

discounting to the member organization if one of the one or more people presents a respective computer display indication to the member organization that the one or more people comprises at least a predetermined number of people.

* * * * *